US009759864B2

(12) United States Patent
Painchaud et al.

(10) Patent No.: US 9,759,864 B2
(45) Date of Patent: Sep. 12, 2017

(54) SPOT-SIZE CONVERTER FOR OPTICAL MODE CONVERSION AND COUPLING BETWEEN TWO WAVEGUIDES

(71) Applicants: Yves Painchaud, Quebec (CA); Marie-Josée Picard, Quebec (CA); Ian Betty, Hanover, MD (US)

(72) Inventors: Yves Painchaud, Quebec (CA); Marie-Josée Picard, Quebec (CA); Ian Betty, Hanover, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/282,965

(22) Filed: Sep. 30, 2016

(65) Prior Publication Data

US 2017/0017034 A1    Jan. 19, 2017

Related U.S. Application Data

(63) Continuation-in-part of application No. 14/635,602, filed on Mar. 2, 2015.
(Continued)

(51) Int. Cl.
*G02B 6/14* (2006.01)
*G02B 6/12* (2006.01)
(Continued)

(52) U.S. Cl.
CPC .............. *G02B 6/14* (2013.01); *G02B 6/124* (2013.01); *G02B 6/125* (2013.01); *G02B 6/1228* (2013.01);
(Continued)

(58) Field of Classification Search
None
See application file for complete search history.

(56) References Cited

U.S. PATENT DOCUMENTS 6,697,551 B2   2/2004   Lee et al.
6,975,798 B2   12/2005  Blauvelt et al.
(Continued)

FOREIGN PATENT DOCUMENTS

EP   1293811 A3   4/2004

OTHER PUBLICATIONS

Hatori, N., et al, "A Hybrid Integrated Light Source on a Silicon Platform using a Trident Spot-Size Converter", Journal of Lightwave Technology, vol. 32, No. 7, Apr. 1, 2014, 8 pages.
(Continued)

*Primary Examiner* — Michelle R Connelly
(74) *Attorney, Agent, or Firm* — Osha Liang LLP (57) ABSTRACT

A spot-size converter for coupling light between a first waveguide and a second waveguide extends along a longitudinal waveguiding axis and includes a transition region. The transition region includes a first part of waveguiding structure, which is coupled to the first waveguide, and a second part of waveguiding structure, which is coupled to the second waveguide. The second part of waveguiding structure includes high-index elements arranged in multiple vertically spaced rows and horizontally spaced columns, and extends along the longitudinal waveguiding axis at least partially over the first part of waveguiding structure so as to define a low-index region where the mode of the first waveguide progressively transforms into the mode of the second waveguide, thereby enabling light propagation via a mode of the combined system of the first and second parts of waveguiding structures.

18 Claims, 4 Drawing Sheets

Related U.S. Application Data (60) Provisional application No. 61/974,140, filed on Apr. 2, 2014, provisional application No. 61/946,068, filed on Feb. 28, 2014.

(51) Int. Cl.
*G02B 6/122* (2006.01)
*G02B 6/125* (2006.01)
*G02B 6/30* (2006.01)
*G02B 6/124* (2006.01)

(52) U.S. Cl.
CPC .... *G02B 6/305* (2013.01); *G02B 2006/12152* (2013.01)

(56) References Cited

U.S. PATENT DOCUMENTS

| | | | |
|---|---|---|---|
| 7,146,087 B2 | 12/2006 | Heideman et al. | |
| 7,317,853 B2 | 1/2008 | Laurent-Lund et al. | |
| 7,565,046 B2 * | 7/2009 | Feng | B82Y 20/00 385/28 |
| 7,577,327 B2 | 8/2009 | Blauvelt et al. | |
| 7,646,957 B2 | 1/2010 | Blauvelt et al. | |
| 7,668,416 B2 | 2/2010 | Li | |
| 7,783,146 B2 | 8/2010 | Blauvelt et al. | |
| 7,853,103 B2 | 12/2010 | Blauvelt et al. | |
| 7,885,499 B2 | 2/2011 | Blauvelt et al. | |
| 8,320,721 B2 | 11/2012 | Cevini et al. | |
| 8,483,528 B2 | 7/2013 | Socci et al. | |
| 8,503,839 B2 | 8/2013 | Cheben et al. | |
| 9,128,240 B2 | 9/2015 | Hatori et al. | |
| 9,195,001 B2 | 11/2015 | Hatori et al. | |
| 2005/0135739 A1 * | 6/2005 | Kim | B82Y 20/00 385/28 |
| 2010/0150494 A1 | 6/2010 | Prosyk et al. | |
| 2013/0170807 A1 | 7/2013 | Hatori et al. | |
| 2013/0188910 A1 | 7/2013 | Tokushima et al. | |
| 2013/0322813 A1 | 12/2013 | Grondin et al. | |
| 2014/0233901 A1 | 8/2014 | Hatori et al. | |
| 2014/0294341 A1 | 10/2014 | Hatori et al. | |

OTHER PUBLICATIONS

Hatori, et al., "A Novel Spot Size Convertor for Hybrid Integrated Light Sources on Photonics-Electronics Convergence System", IEEE, Jan. 1, 2012, pp. 171-173.

Roeloffzen et al., "Silicon Nitride Microwave Photonic Circuits," Optical Society of America, Sep. 23, 2013, Optics Express, vol. 21, No. 19, pp. 22937-22961.

Bakir et al., "Low-Less (<1dB) and Polarization-Insensitive Edge Fiber Couplers Fabricated on 200-mm Silicon-on-Insulator Wafers", Jun. 1, 2010, IEEE Photonics Technology Letters, vol. 22, No. 11, pp. 739-741.

Morichetti et al., "Box-Shaped Dielectric Waveguides: A New Concept in Integrated Optics?", Journal of Lightwave Technology, Sep. 1, 2007, vol. 25, No. 9, pp. 2579-2589.

Cheben et al., "Subwavelength Waveguide Grating for Mode Conversion and Light Coupling in Integrated Optics", Optical Society of America, May 29, 2006, Optics Express, vol. 14, No. 11, pp. 4695-4702.

Loh et al., "Ultra-Compact Multilayer SI/SIO2 GRIN Lens Mode-Size Converter for Coupling Single-Mode Fiber to Si-wire Waveguide", Optical Society of America, Oct. 10, 2010, Optics Express, vol. 18, No. 21, pp. 21519-21533.

Shoji et al., "Low Loss Mode Size Converter from 0.3pm Square Si wire Waveguides to Singlemode Fibres", Electronics Letters, Dec. 6, 2002, vol. 38, No. 25, pp. 1669-1670.

Tolstikhin, "Multi-Guide Vertical Integration in InP-A Regrowth-Free PIC Technology for Optical Communications", CS Mantech Conference, May 13-16, 2013, New Orleans, Louisiana, USA, pp. 23-26.

Lionix, "Platform TriPleX™ Design Manual High Contrast", Phoenix Software- Solutions for Micro and Nano Technologies, May 27, 2013, pp. 1-14.

Urino et al., "First Demonstration of Athermal Silicon Optical Interposers with Quantum Dot Lasers Operating up to 125° C", IEEE, Jan. 1, 2013, pp. 1-8.

* cited by examiner

SPOT-SIZE CONVERTER FOR OPTICAL MODE CONVERSION AND COUPLING BETWEEN TWO WAVEGUIDES

RELATED PATENT APPLICATIONS

This patent application is a continuation-in-part of U.S. patent application Ser. No. 14/635,602 filed Mar. 2, 2015, which claims priority to U.S. Provisional Patent Application No. 61/946,068 filed Feb. 28, 2014, and U.S. Provisional Patent Application No. 61/974,140 filed Apr. 2, 2014. Each of these applications is incorporated by reference herein in its entirety.

FIELD OF INVENTION

The present invention relates generally to integrated photonic waveguides and, in particular, to spot-size converters providing mode conversion between two waveguides supporting propagation modes of different dimensions.

BACKGROUND OF INVENTION

Integration of optical components into a silicon-on-insulator (SOI) platform allows for the fabrication of a small size device, down to a submicron level, compatible with silicon electronic components and standard fabrication processes. Such optical components may have propagation modes of different dimensions (used interchangeably herein with "spot-sizes") and shapes. For example, components such as waveguides, splitters and electro-optic modulators typically have a small spot-size of about 0.5 µm. Optical fibers have a larger spot-size of about 10 µm. These photonic components are coupled with each other via a spot-size converter to avoid energy loss due to their spot-size mismatch during the propagation from one optical component to another.

An existing spot-size converter that converts the spot-size of a first waveguide into the spot-size of a second waveguide simply involves a longitudinal transitional waveguiding structure between the two waveguides. When the waveguiding structure is large enough, the waveguiding structure confines light substantially all along the structure. The light confined in the first waveguide, having a spot-size similar to the size of the first waveguide, may gradually change the spot-size, as the light propagates through a transitional waveguiding structure, up to a size similar to the size of the second waveguide when the light reaches the second waveguide. The transitional waveguiding structure region may include changes in the width, height, or both. Such a simple waveguiding structure may be referred to as a tapered waveguiding structure. Typically, this type of a spot-size converter with a tapered waveguiding structure has a limited capability for converting a spot-size and is not sufficient to convert the spot-size from about 0.5 µm up to about 10 µm.

Another existing spot size converter involves a transitional waveguiding structure including a tapered region and a region where the waveguiding structure is not large enough to substantially confine the light. Similarly to the existing spot-size converter with a tapered waveguiding structure discussed above, the light confined in a first waveguide may pass through the transitional waveguiding structure where the width, height or both are decreased such that the waveguiding structure confines the light significantly less. Consequently, instead of decreasing, the spot-size rather increases and most of the light extends outside of the core of the waveguiding structure when the light reaches the second waveguide. This type of a waveguiding structure may be referred to as an inverted-taper waveguiding structure. Again here, this type of a spot-size converter with an inverted taper waveguiding structure has a limited capability for converting a spot-size and is not sufficient to convert the spot-size from about 0.5 µm up to about 10 µm.

Figure 1A:
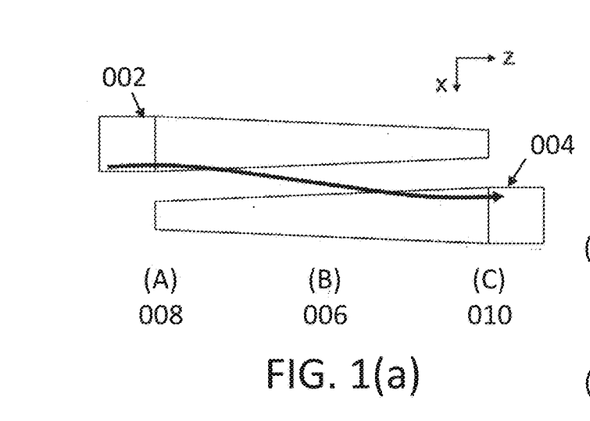
FIG. 1(a) shows two inverted taper waveguiding structures placed side-by-side in accordance with one or more embodiments of the invention.

Yet another type of a spot size converter may be composed of two such inverted taper waveguiding structures. Due to the poor confining capability at the tip of an inverted taper waveguiding structure, an interaction with another inverted taper waveguide in close lateral proximity, for example, placed side-by-side with their tapered tips in opposite directions, as illustrated in FIG. 1(a), may cause exchange of energy. Thus, the light from a first inverted taper waveguiding structure may be transferred in a second inverted taper waveguiding structure. A condition for an efficient exchange of energy between the two waveguiding structure is that their mode overlap is sufficiently large. Another condition for an efficient exchange of energy is that phase velocities (i.e. the effective refractive indices) in the two waveguiding structures substantially match. Due to the use of two different waveguides, this type of a spot-size converter with two inverted taper waveguiding structures may offer a better capability for converting a spot-size.

Fabrication of silicon optical devices involves successive deposition, treatment and partial etching of different materials on top of each other. In the etching process, chemicals may be used to preferentially etch one material while leaving another one virtually intact. Specifically, an etching process of the first material may be accurately controlled to stop when reaching the second material. The second material act as a so-called "etch stop" for the first material. In particular, a dielectric material such as silicon nitride can act as an etch stop for another dielectric material such as silicon oxide. As a result, thin layers of silicon nitride are often used as etch stop for silicon oxide within a stack of different layers containing different levels of metal circuits.

SUMMARY OF INVENTION

In one aspect, one or more embodiments of the invention relate to a spot-size converter for coupling light between a first waveguide and a second waveguide extending along a longitudinal waveguiding axis and including a transition region. The transition region includes a first part of waveguiding structure, which is coupled to the first waveguide, and a second part of waveguiding structure, which is coupled to the second waveguide. The second part of waveguiding structure includes high-index elements arranged in multiple vertically spaced rows and horizontally spaced columns, and extends along the longitudinal waveguiding axis at least partially over the first part of waveguiding structure so as to define a low-index region, where the mode of the first waveguide progressively transforms into the mode of the second waveguide, thereby enabling light propagation via a mode of the combined system of the first and second parts of waveguiding structures.

In another aspect, one or more embodiments of the invention relate to a silicon photonic spot-size converter for coupling light between a first waveguide and a second waveguide, respectively supporting a first and a second propagation modes having substantially different dimensions, and extending along a longitudinal waveguiding axis. The silicon photonic spot-size converter includes silicon substrate, an insulating layer formed on the silicon substrate, and a silicon core formed on the insulating layer, which is coupled to the first waveguide. The silicon core is characterized by a longitudinally varying first effective refractive index that decreases toward the second end along the longitudinal waveguiding axis. The silicon photonic spot-size converter further includes high-index rods arranged in multiple vertically spaced rows and horizontally spaced columns, extending along the longitudinal waveguiding axis partially over the first part of waveguiding structure so as to define a low-index region where the mode of the first waveguide progressively transforms into the mode of the second waveguide, thereby enabling light propagation via a mode of the combined system of the first part of and second part of waveguiding structures.

Other aspects and advantages of the invention will be apparent from the following description and the appended claims.

BRIEF DESCRIPTION OF DRAWINGS

Embodiments of the invention will be described with reference to the accompanying drawings. However, the accompanying drawings illustrate only certain aspects or implementations of one or more embodiments of the invention by way of example and are not meant to limit the scope of the claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the claimed invention relate to integrated photonic waveguides and, in particular, to spot-size converters providing mode conversion between two waveguides supporting propagation modes of different dimensions.

Overview of Spot-Size Converter

The original disclosure in U.S. patent application Ser. No. 14/635,602, of which this application is a continuation-in-part, describes a spot-size converter to couple light from a first waveguiding structure supporting a first propagation mode into a second waveguiding structure supporting a second propagation mode, in which the first and second propagation modes have substantially different spot-sizes. The first waveguiding structure may be a submicron strip silicon waveguide on silicon photonics chips. The second waveguiding structure may be an optical fiber used to couple light in or out of an SOI chip. Optical fibers usually have light guiding cores of dimensions of about 10 µm, which are much greater than those of typical submicron silicon photonic waveguides. For efficient coupling, a spot-size converter may be designed to have a core of a substantially similar spot-size at an end as the core of the optical fiber, leading to a large overlap with the mode of the optical fiber.

As shown in FIG. 1(a), in a spot-converter, the first waveguiding structure 002 and the second waveguiding structure 004 may be placed side-by-side to allow light propagation from one waveguiding structure to the other, via a coupling between the waveguiding structures 002, 004. In one or more embodiments, one or both of the waveguiding structures 002, 004 may include a longitudinally tapered portion tapering down toward one or both ends thereof. In the configuration of FIG. 1(a), the first and second waveguiding structures 002, 004 are longitudinally tapered similarly, but in one or more embodiments the first waveguiding structure 002 may be longitudinally tapered differently from the second waveguiding structure 004, where the profile (e.g., the slope) of the longitudinally tapered portions of the first waveguiding structure 002 is different (e.g., steeper) from the profile (e.g., the shape) of the longitudinally tapered portions of the second waveguiding structure 004.

Figure 1B:
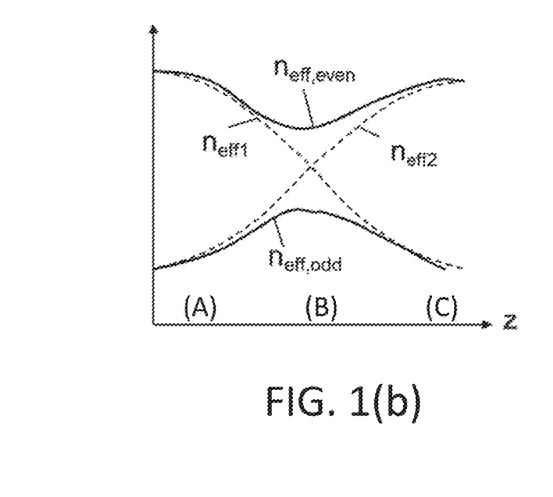
FIG. 1(b) shows effective refractive indices of individual propagation modes of the waveguiding structures, even and odd super-modes.

Due to their mode overlap, and the crossing of their effective refractive indices $n_{eff1}$ and $n_{eff2}$, a coupling occurs between the first and second waveguiding structures 002, 004 in the coupling region (B) 006 as shown in FIG. 1(b). As used herein, the term "effective refractive index" refers to a property of a waveguiding structure that quantifies the decrease in the local phase velocity of light propagating in the waveguiding structure compared to its phase velocity in vacuum. The effective refractive index represents the refractive index of a uniform material in which light would propagate with the same phase velocity as in the waveguiding structure. The effective refractive index of a waveguiding structure depends on its material properties, on the temperature, on the wavelength of light propagating therein, on its geometrical parameters (e.g., its cross-sectional profile) and, for multi-mode waveguiding structures, on the mode in which light propagates.

Figure 1C:
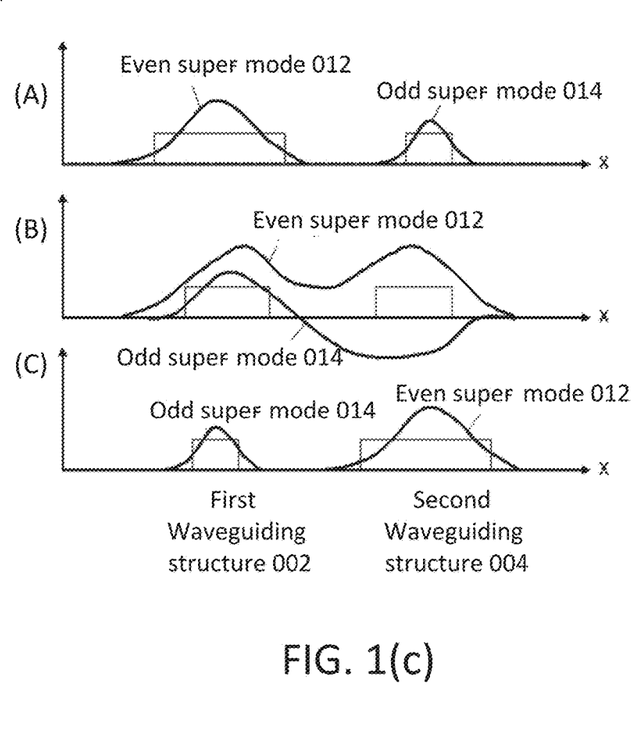
FIG. 1(c) shows spatial distribution of the even and odd super-modes.

Below, the light propagation in an overall system as a whole is discussed, instead of in the two coupled individual waveguiding structures, in the coupling region (B) 006, the overall system of the two coupled waveguides 002, 004 is no longer characterized by the individual propagation modes of the two waveguiding structures 002, 004, but rather by "super-modes" of the whole structure. As used herein, the term "super-mode" refers to a mode that is a combination of the modes of the individual waveguides which are spatially added, either in-phase ("even super-mode") or out-of-phase ("odd super-mode"). As shown in FIG. 1(c), the even super-mode 012 transitions from the propagation mode of the first waveguiding structure 002 at a first end (A) 008 of the coupling region (B) 006 to the propagation mode of the second waveguiding structure 004 at a second end (C) 010 of the coupling region (B) 006 via a shared mode of the first and second waveguiding structures 002, 004 added in-phase in the coupling region (B) 006. The odd super-mode transitions 014 from the propagation mode of the second waveguiding structure 004 at the first end (A) 008 to the propagation mode of the first waveguiding structure 002 at the second end (C) 010 of the coupling region (B) 006, via a shared mode of the first and second waveguiding structures 002, 004 added out-of-phase.

Accordingly, as shown in FIG. 1(b), the effective refractive index of the even super-mode 012, $n_{eff,\ even}$, transitions from $n_{eff1}$ at the first end (A) 008 to $n_{eff2}$ at the second end (B) 006. The effective refractive index of the odd super-mode 014, $n_{eff,\,odd}$, is the same as $n_{eff2}$ at the first end (A) 008 and the same as $n_{eff1}$ at the second end C (010). In the coupling region (B) 006, both $n_{eff,\,even}$ and $n_{eff,\,odd}$ differ from $n_{eff1}$ and $n_{eff2}$. The splitting between $n_{eff,\,even}$ and $n_{eff,\,odd}$ increases as the coupling strength increases.

However, if the super-modes 012, 014 at one or both ends (A, C) 008, 010 of the coupling region (B) 006 are not the same as the propagation modes of the individual waveguides 002, 004, the odd super-mode 014 is excited, which causes mode beating and increases coupling loss. Therefore, the waveguiding structures 002, 004 may be tailored and designed by appropriately selecting the material forming the high-index elements (which may differ from one high-index element to another), their individual size and shape, as well as their relative arrangement (i.e., their relative positioning and mutual separation).

Further, for optimized operation, the individual waveguides may each support only one propagation mode for each of the TE (transverse electric) and TM (transverse magnetic) polarizations. Single mode operation over a large distance requires that the difference between the effective refractive indices of the waveguiding structures and cladding (surrounding medium) be small. The use of materials with high contrast in the refractive indices together in process of fabricating planar optic circuits may allow accurate control of the effective refractive indices. For example, a waveguiding structure may be a multi-rod structure ("MRS") made of a plurality of high-index elements in order to mimic the property of a low-index material. As used herein, the term "high-index" or "low-index" element refers to an element having a refractive index that is sufficiently higher or lower than a refractive index of the medium surrounding this element. In addition, the accurate control of the effective refractive indices may lead to the required coupling between two waveguiding structures discussed above.

The present invention adds two implementations to the original invention described in U.S. patent application Ser. No. 14/635,602, in light of the above.

The first additional implementation includes one or more embodiments in which light propagates from the first waveguiding structure into the second waveguiding structure through an "adiabatic progressive transformation," as in a simple tapered waveguiding structure, and at least one of the two waveguiding structures are or contain a multi-rod structure ("MRS") made of a plurality of high-index elements. In such a transformation, light propagates in the propagation mode of the first waveguiding structure, which is preferably single-mode, then in the coupling region which is also preferably single-mode, and then in the propagation mode of the second waveguiding structure, which is further preferably single-mode. The overall system may thus be preferably single-mode all along the propagation direction and undesirable coupling to other propagation modes may be mitigated. The same is true for each of the TE and TM polarizations. This is in direct contrast to two waveguiding structures placed side-by-side in which energy is exchanged through evanescent coupling between two individual propagation modes and in which the overall coupling region is bimodal (i.e. supporting the propagation of an even mode and an odd mode). In this last case, although the spot size converter may be designed such that only the even mode is excited, there may be potential imperfections, such as waveguide surface roughness, to cause undesired coupling to the odd.

The second additional implementation includes one or more embodiments in which dielectric material is used in the multi-rod structure as a core of the second waveguiding structure and also as an etch stop to ease the fabrication of integrated optical devices.

MRS-Based Spot-Size Converter

Figure 2A:
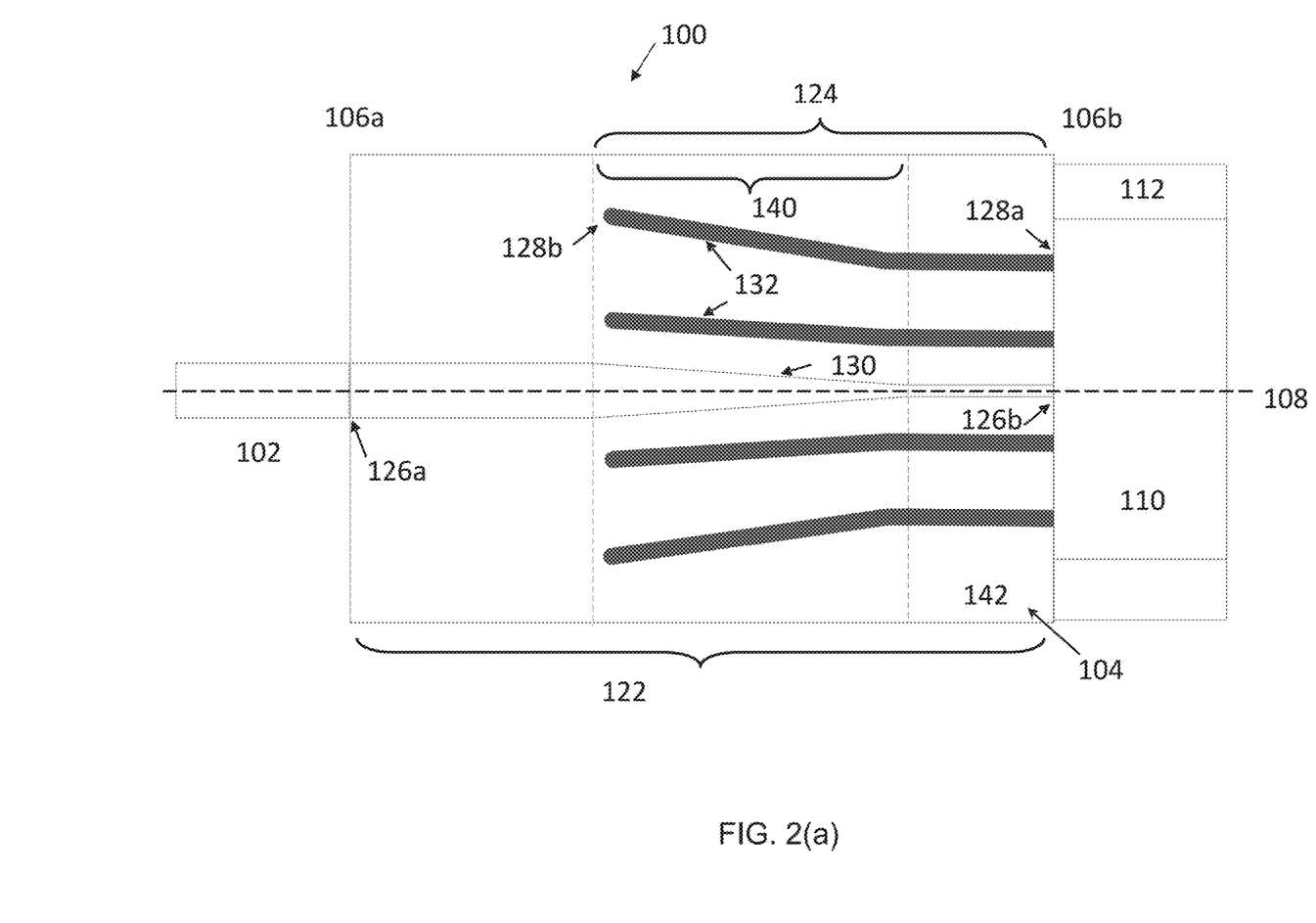
FIGS. 2(a) and 2(b) are schematic perspective views of a spot-size converter for coupling light between two waveguides.
Figure 2B:
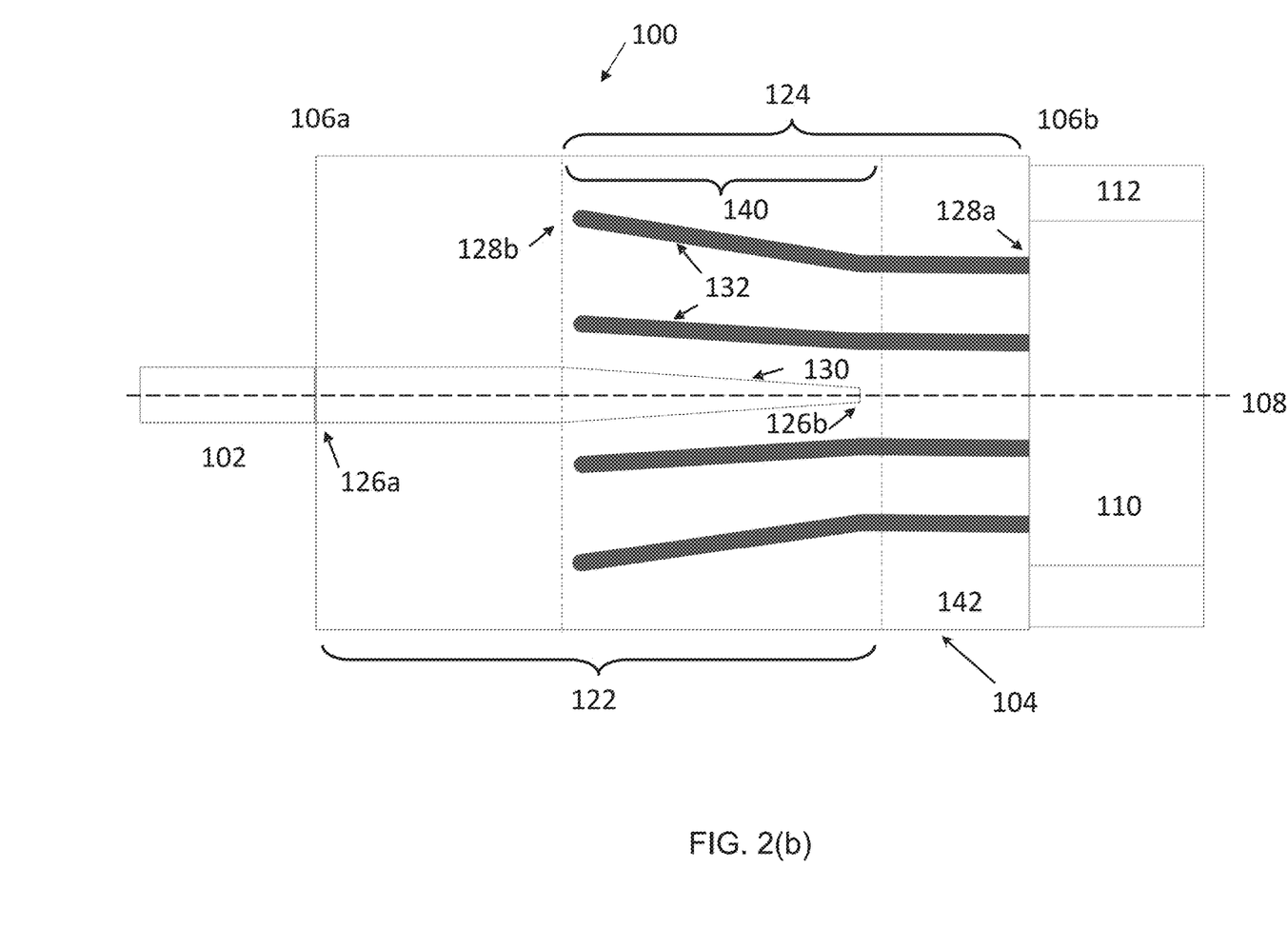
Figure 3:
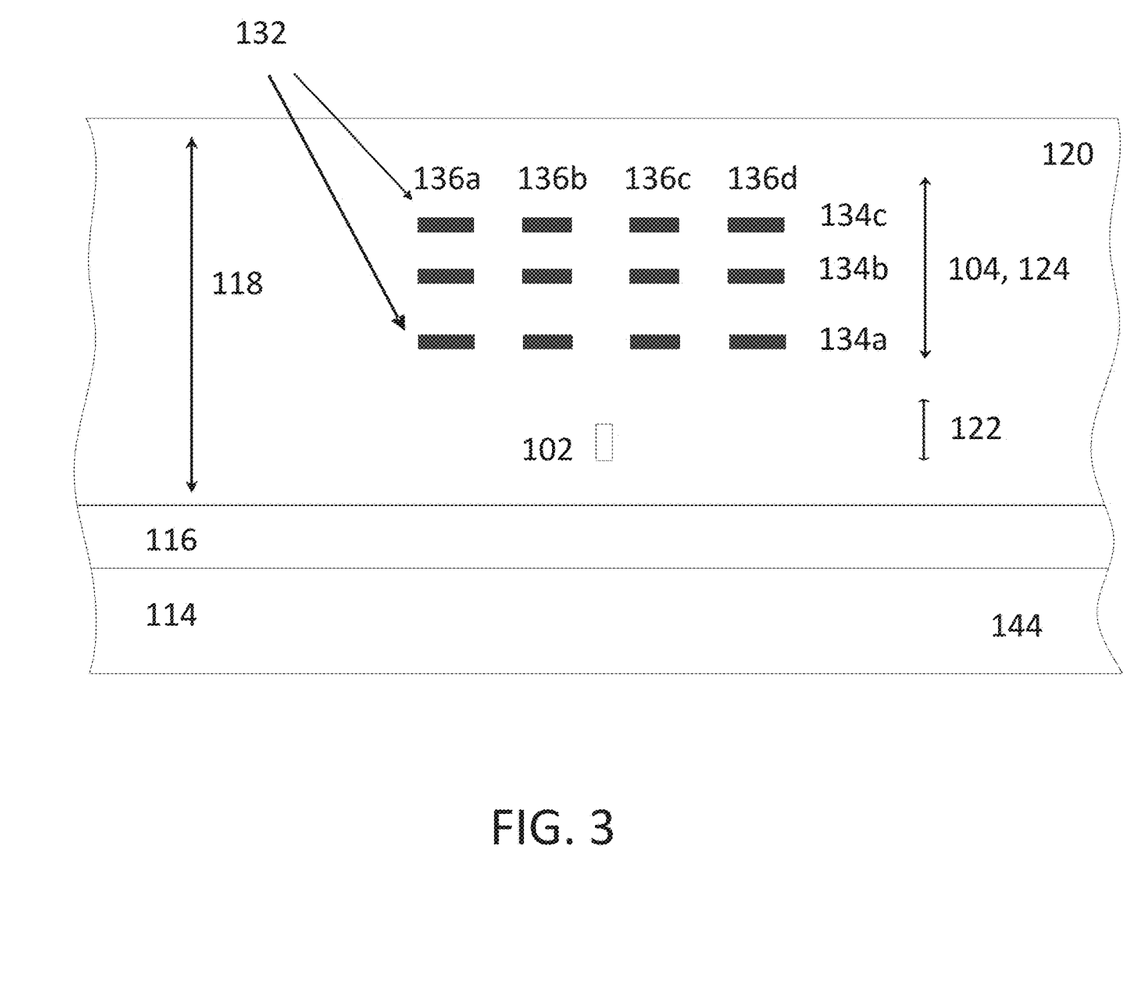
FIG. 3 is a front view of the spot-size converter of FIGS. 2(a) and 2(b).

FIGS. 2(a), 2(b), and 3 show exemplary configurations of a spot-size converter 100 for coupling light between a first waveguide 102 (i.e. an input of the spot-size converter 100) and a second waveguide 104 (i.e. an output of the spot-size converter 100), respectively supporting a first and a second propagation modes. The first and second waveguides 102, 104, as well as the respective propagation modes carried thereby, may have substantially different dimensions. The spot-size convertor 100 extends between a first end 106a and an opposite second end 106b along a longitudinal waveguiding axis 108 so as to define a light path between the first and second waveguides 102, 104.

In one or more embodiments, the first waveguide 102 may be a conventional silicon strip waveguide having a width of 300 nm to 600 nm and a height of 100 to 350 nm. The first waveguide 102 is optically connected to the first end 106a of the spot-size converter 100. In this configuration, the first waveguide 102 is single-mode for both TE and TM polarizations. This configuration for the first waveguide 102 is provided by way of example only, since various other structures, geometrical dimensions and coupling arrangement to the spot-size converter may be used. For example, in one or more embodiments, the first waveguide 102 may be embodied by any other appropriate types of single-mode or multi-mode planar waveguides including, but not limited to, a rib waveguide, a slot waveguide and a ridge waveguide. The first waveguide 102 may also be embodied by any other appropriate materials including, but not limited to, silicon, silicon nitride, silicon oxy-nitride and silicon-rich oxide.

The second waveguide 104 is optically connected to a third waveguide which may be a single-mode optical fiber at the second end 106b of the spot-size converter 100. The optical fiber includes a fiber core 110 having a mode field diameter (MFD) of about 3 to 12 μm and defining a light-guiding path of the second waveguide 104. The fiber core 110 is surrounded by a fiber cladding 112. Embodiments of the present invention are not limited to a particular type or size of optical fiber. In particular, the optical fiber may be made of plastic, glass, quartz, silica or the like, and may include, without being limited to single-mode fibers, multi-mode fibers, polarization-maintaining fibers, microstructured fibers, multicore fibers, single-cladding fibers, multi-cladding fibers, doped fibers, high or ultra high numerical aperture fibers, fiber arrays, or any other non-typical or customized fibers.

In one or more embodiments of the invention, the spot-size converter 100 shown in FIG. 3 is a spot-size converter including the first waveguide 102, the second waveguide 104, a silicon substrate 114, an insulating layer 116 made of silica or another suitable material deposited on the silicon substrate 114, and a waveguiding region 118 provided on top of the insulating layer 116 and embedded in a cladding structure 120.

While the insulating layer 116 and the cladding structure 120 may both be made of the same material (e.g., silica), their refractive indices may differ slightly due to the use of different deposition techniques. In the illustrated configuration, the spot-size converter 100 and the first waveguide 102 are formed from the same SOI wafer, so that they share the same silicon substrate 114, insulating layer 116 and cladding structure 120. As mentioned above, in one or more embodiments, the spot-size converter 100 may not be based on SOI technology.

The waveguiding region 118 of the spot-size converter 100 is responsible for converting the spot size of light propagating along the longitudinal waveguiding axis 108 between the first and second waveguides 102, 104. The waveguiding region 118 generally includes a first part of waveguiding structure 122 and a second part of waveguiding structure 124. The first part of waveguiding structure 122 has a first end 126*a* and an opposed second end 126*b*, the first end 126*a* being coupled to the first waveguide 102 to receive light therefrom or transmit light thereto in the first propagation mode. Similarly, the second part of waveguiding structure 124 has a first end 128*a* and an opposed second end 128*b*, the first end 128*a* being coupled to the third waveguide 110 to receive light therefrom or transmit light thereto. In one or more embodiments, the first part of the waveguiding structure 122 extends over the second waveguide 104, as shown in FIG. 2(*a*). In one or more embodiments, the first part of the waveguiding structure 122 does not overlap with the second waveguide 104, as shown in FIG. 2(*b*). Depending on the application, each of the first and second parts of waveguiding structures 122, 124 may be made of various materials including, but not limited to, silicon, silicon oxynitride, silicon oxide, silicon nitride, silicon carbide, indium phosphide, gallium arsenide, a polymer or a combination thereof.

First Part of the Waveguiding Structure

Referring still to FIGS. 2(*a*), 2(*b*), and 3, the first part of waveguiding structure 122 may consist of a single waveguide element made of silicon or silicon nitride and extending along the longitudinal waveguiding axis 108. The first part of waveguiding structure 122 is formed on the insulating layer 116 of the SOI wafer and is patterned from the same thin silicon layer as the first waveguide 102. In the illustrated configuration, the first part of waveguiding structure 122 is single-mode for both TE and TM modes, but this may not be the case in one or more embodiments.

In one or more embodiments, the first part of waveguiding structure 122 may include a longitudinally tapered portion 130 tapering down toward the second end 126*b* thereof. In FIGS. 2(*a*), 2(*b*), and 3, the first part of waveguiding structure 122 has a length of few hundreds of μm, a constant height of 150 to 750 nm and a width that tapers from few hundreds of nm at the first end 126*a* to about 100 nm or less at the second end 126*b*. In one or more embodiments, the width of the first part of waveguiding structure 122 at the second end 126*b* may be as small as possible by the manufacturing process.

In one or more embodiments, the first part of waveguiding structure 122 may have a first longitudinally tapered portion tapering from the first end 126*a* down to an intermediate location of the first part of waveguiding structure 122 and a second longitudinally tapered portion tapering from the intermediate location down to the second end 126*b*, where the profile (e.g., the slope) of the first longitudinally tapered portion is different (e.g., steeper) from the profile (e.g., the shape) of the second longitudinally tapered portion. Such an arrangement may contribute to reduce the overall length of the first part of waveguiding structure 122. A more complicated longitudinal variation may also be determined to further reduce the overall length.

As used herein, the terms "length" and variants thereof refer to a dimension of a waveguide or waveguiding structure in the light propagation direction and along the longitudinal waveguiding axis 108. The terms "width" and variants thereof are herein to refer to a dimension of a waveguide perpendicular to the longitudinal waveguiding axis 108 and parallel the conventional plane or surface of the substrate on which the waveguide is formed. The terms "height" and variants thereof refer to a dimension of a waveguide perpendicular to both the length and width and also to the conventional plane or surface of the substrate. In some instances, the term "height" may be used substituted by the term "thickness". In this regard, the terms "vertical" and variants thereof refer to a direction perpendicular to a plane parallel to the conventional plane or surface of the substrate, that is, along the "height" (or "thickness") direction. Likewise, the terms "horizontal" and variants thereof are used to refer to directions lying in a plane which is perpendicular to the vertical direction as defined, that is, encompassing the "width" and "length" directions.

Continuing with FIGS. 2(*a*), 2(*b*), and 3, in order to ensure good mode overlap between the first part of waveguiding structure 122 and the first waveguide 102, it is desirable that the spot size of the first part of waveguiding structure 122 at the first end 126*a* thereof substantially coincide with those of the first propagation mode carried in the first waveguide 102.

In the configuration of FIGS. 2(*a*), 2(*b*), and 3, as the first part of waveguiding structure 122 tapers down 130 toward the second end 126*b* thereof, the mode guided in the first part of waveguiding structure 122 becomes less confined so as to gradually expand in the cladding structure 120. In the illustrated configuration, the mode evolution of light propagating along the first part of waveguiding structure 122 is preferably adiabatic, or close to adiabatic. As known in the field of optical waveguides, the term "adiabatic" is intended to mean that variations in the cross-sectional profile of a waveguide are sufficiently slow and smooth to render coupling to other modes and radiative losses negligible or below some operationally acceptable level.

The configurations for the first part of waveguiding structure 122 illustrated in FIGS. 2(*a*), 2(*b*), and 3 provided by way of example only, as various other structural arrangements, optical properties, geometrical dimensions and materials may be used in one or more embodiments. For example, the longitudinally tapered portion 130 in FIGS. 2(*a*), 2(*b*), and 3 is a taper having a constant height profile, but may alternatively or additionally have a height profile that tapers longitudinally down toward the second end 126*b* of the first part of waveguiding structure 122. Also, the slope of the longitudinally tapered portion 130 may be constant or not along its length (i.e., the longitudinally tapered portion 130 may form a linear or a non-linear taper), and may or may not form an adiabatic taper. More regarding other possible configurations for the first part of waveguiding structure 122 will be discussed further below.

Second Part of the Waveguiding Structure

Referring still to FIGS. 2(*a*), 2(*b*), and 3, in the illustrated configuration the second part of waveguiding structure 124 includes a region that extends over the first part of waveguiding structure (an overlap region) 140 and the second waveguide 104 including a multi-rod structure (MRS) region 142. Within MRS region 142, a multi-rod structure 132 exists, which is embodied by a plurality of optically coupled high-index elements extending along the longitudinal waveguiding axis 108 and arranged in a two-dimensional array in a plane transverse to the longitudinal waveguiding axis 108. The multi-rod structure 132 may, for example, be made of various materials including, but not limited to, silicon nitride, silicon, silicon oxynitride, silicon oxide, silicon carbide, indium phosphide, gallium arsenide, a polymer, a combination thereof or other suitable materials. In one or more embodiments, the multi-rod structure may include an arbitrary number of rods arranged in a way that that, together, they mimic a low-index material. Thus, although twelve rod layers arranged in multiple vertically spaced rows and horizontally spaced columns (in a Cartesian arrangement where the rows and columns are arranged along two orthogonal axes, respectively) are shown in FIGS. 2(a) and 2(b), there may be any suitable number of rods and/or rod layers in any suitable positioning, including a non-Cartesian arrangement (where the rows and columns are not arranged along the two orthogonal axes, respectively), in the multi-rod structure 132 to facilitate such an arrangement that achieves mimicking of a low-index material.

The multi-rod structure 132 is embedded in the cladding structure 120 and includes, by way of example, three vertically spaced rows 134a to 134c and four horizontally spaced columns 136a to 136d of high-index elements. The high-index elements 132 may have a height of about 50 nm, a width of few hundreds of nm, a length of several hundreds of microns, and a longitudinally uniform cross-section. The vertical spacing between adjacent rows may be between 300 nm and 3000 nm while the horizontal spacing between adjacent columns may be about 200 to 2000 nm. These dimensions are provided by way of example only and may be varied in one or more embodiments. In the illustrated configuration, the separation between the high-index elements is substantially larger than their corresponding heights, but this may not be the case in one or more embodiments.

A second part of waveguiding structure 124 such as in FIGS. 2(a), 2(b), and 3, which has relatively large lateral dimensions and is formed of the multi-rod structure 132, may provide an efficient way to form an overall waveguiding structure capable of carrying a mode whose size and effective refractive index may match, for example, those of a standard or high numerical aperture (HNA) optical fiber.

The configurations for the second part of waveguiding structure 124 illustrated in FIGS. 2(a), 2(b), and 3 are provided by way of example only, as various other structural arrangements, optical properties, geometrical dimensions and materials may be used in one or more embodiments. For example, while the multi-rod structure 132 forms a two-dimensional linear array of high-index rods in FIGS. 2(a), 2(b), and 3, this may not be the case in one or more embodiments as long as the multi-rod structure 132 are arranged in multiple vertically spaced rows and/or columns. Indeed, in one or more embodiments, the multi-rod structure 132 may form of a stack of vertically spaced high-index sheets. Also, while in FIGS. 2(a), 2(b), and 3 the second part of waveguiding structure 124 is arranged symmetrically with respect to the longitudinal waveguiding axis 108, this may not be the case in one or more embodiments.

The multi-rod structure 132 as illustrated in FIGS. 2(a), 2(b), and 3 is positioned above the first part of waveguiding structure 122. Other configurations may be used. For example, the first part of waveguiding structure 122 may be located on top of the multi-rod structure 132 or even in between.

The multi-rod structure 132 may not be configured as a linear array but may be provided at arbitrary locations that do not conform to a specific pattern. Likewise, the cross-sectional profile of the individual high-index elements may not be rectangular and may vary in size and/or shape along the longitudinal waveguiding axis 108. Also, while the effective refractive index of the second part of waveguiding structure 124 is substantially constant along its length in the configuration of FIGS. 2(a), 2(b), and 3, this may not be the case in one or more embodiments.

Spot-Size Converter

In one or more embodiments, the multi-rod structure 132 together with the longitudinally tapered portion 130 of the first part of waveguiding structure 122 may provide a low-index region in the overlap region 140, in which the first waveguiding structure 122 is progressively added to the second part of waveguiding structure 124. Therefore, a combined system of the first part of waveguiding structure 122 and the second part of waveguiding structure 124 as a whole may effectively form a single tapered waveguiding structure that converts the spot-size. In the combined system, light propagates from the first waveguide 102 to the second waveguide 104 via a propagation mode of the combined system, without causing the coupling to other propagation modes.

A spot-size converter as shown in FIGS. 2(a), 2(b), and 3 may be fabricated on commercially available standard silicon photonic platforms, which contain high-index material layers. Thickness and position of such high-index material layers may be similar to those required for high-index elements in one or more embodiments of the spot-size converter. The elements required for a spot-size converter may be defined on such a commercially available silicon photonic platform by standard etching processing. Accordingly, fabrication process of a spot-size converter may be simplified, and associated time and cost may be reduced.

Additionally, such high-index material layers may be used as markers in an etching process. Specifically, other material deposited on top of a silicon nitride (high-index material) layer may be etched and when the etching reaches the silicon nitride layer, its presence at the surface may be detected and the etching process may be stopped. The use of the silicon nitride layers may further simplify the fabrication process because there is no need for separate optimization and fabrication of the inter-metallic materials and the materials used for making the spot-size converter.

While the invention has been described with respect to a limited number of embodiments, those skilled in the art, having benefit of this disclosure, will appreciate that one or more embodiments may be devised without departing from the scope of the invention as disclosed herein. Accordingly, the scope of the invention should be limited only by the attached claims.

What is claimed is:

1. A spot-size converter for coupling light between a first waveguide and a second waveguide respectively supporting a first and a second propagation modes, the spot-size converter extending along a longitudinal waveguiding axis and comprising a transition region that includes:
   a first part of waveguiding structure having a first end and a second end opposed to the first end,
      wherein the first end thereof is coupled to the first waveguide to receive light therefrom or transmit light thereto in the first propagation mode; and
   a second part of waveguiding structure having a first end and a second end opposed to the first end,
      wherein the first end thereof is coupled to the second waveguide to transmit light thereto or receive light therefrom in the second propagation mode,
      the second part of waveguiding structure having a plurality of high-index elements arranged in multiple vertically spaced rows and horizontally spaced columns, extending along the longitudinal waveguiding axis at least partially over the first part of waveguiding structure so as to define a low-index region wherein the first propagation mode of the first waveguide extends outside the first waveguide and progressively transforms into the second propagation mode of the second waveguide, thereby enabling light propagation via a mode of a combined system of the first and second parts of waveguiding structure.

2. The spot-size converter according to claim 1, where the first waveguide has a spot-size of 0.3-0.7 µm and the second waveguide has a spot-size of 5-10 µm.

3. The spot-size converter according to claim 1, wherein the first part of waveguiding structure tapers along the longitudinal waveguiding axis in the low-index region.

4. The spot-size converter according to claim 1, wherein at least one of the plurality of high-index elements of the second part of waveguiding structure tapers along the longitudinal waveguiding axis in the low-index region.

5. The spot-size converter according to claim 1, wherein the first part of waveguiding structure comprises of a single waveguide element extending along the longitudinal waveguiding axis.

6. The spot-size converter according to claim 5, wherein the single waveguide element comprises a tapered portion tapering down toward the second end thereof along the longitudinal waveguiding axis.

7. The spot-size converter according to claim 6, wherein the tapered portion forms an adiabatic taper.

8. The spot-size converter according to claim 1, wherein the combined system of the first and second parts of waveguiding structure is single-mode along the longitudinal waveguiding axis.

9. The spot-size converter according to claim 1, wherein the first and second parts of waveguiding structure are made of silicon, silicon nitride, silicon carbide, silicon oxynitride, silicon oxide, indium phosphide, gallium arsenide, a polymer or a combination thereof.

10. The spot-size converter according to claim 1, wherein the first part of waveguiding structure is a part of a silicon-on-insulator (SOI) arrangement comprising a silicon substrate, an insulating layer formed on the silicon substrate, and a silicon layer formed on the insulating layer and patterned to form the first part of waveguiding structure.

11. The spot-size converter according to claim 1, wherein the first part of waveguiding structure is made of silicon nitride.

12. The spot-size converter according to claim 1, wherein the plurality of high-index elements of the second part of waveguiding structure comprise a plurality of high-index rods arranged in a two-dimensional array in a plane transverse to the longitudinal waveguiding axis.

13. A silicon photonic spot-size converter for coupling light between a first waveguide and a second waveguide respectively supporting a first and a second propagation modes having substantially different dimensions, the spot-size converter extending along a longitudinal waveguiding axis and comprising:
a silicon substrate;
an insulating layer formed on the silicon substrate;
a silicon core formed on the insulating layer, the silicon core having a first end and a second end opposed to the first end, the first end being coupled to the first waveguide to receive light therefrom or transmit light thereto in the first propagation mode, the silicon core being characterized by a longitudinally varying first effective refractive index that decreases toward the second end thereof; and
a plurality of high-index rods arranged in multiple vertically spaced rows and horizontally spaced columns, extending along the longitudinal waveguiding axis partially over the silicon core so as to define a low-index region wherein the first propagation mode of the first waveguide extends outside the first waveguide and progressively transforms into the second propagation mode of the second waveguide, thereby enabling light propagation via a mode of the combined system of the silicon core and the plurality of high-index rods.

14. The silicon photonic spot-size converter according to claim 13, where the first waveguide has a spot-size of 0.3-0.7 µm and the second waveguide has a spot-size of 5-10 µm.

15. The silicon photonic spot-size converter according to claim 13, wherein the high-index rods are used as markers in an etching process of inter-metallic materials.

16. The silicon photonic spot-size converter according to claim 13, wherein each of the high-index rods comprises a tapered portion tapering down toward the second end thereof along the longitudinal waveguiding axis.

17. The silicon photonic spot-size converter according to claim 13, further comprising a cladding structure embedding the plurality of high-index rods.

18. The silicon photonic spot-size converter according to claim 13, wherein the cladding structure comprises:
a first cladding formed on the insulating layer and surrounding the silicon core;
a second cladding formed on the first cladding layer and embedding the plurality of high-index rods.

* * * * *